United States Patent Office

3,163,551
Patented Dec. 29, 1964

3,163,551
PROCESS FOR DYEING HIGH-MOLECULAR ORGANIC PRODUCTS WITH PIGMENT DYESTUFFS
Max Staeuble and Kurt Weber, Basel, Switzerland, assignors to Ciba Limited, Basel, Switzerland, a company of Switzerland
No Drawing. Filed Apr. 11, 1962, Ser. No. 186,621
Claims priority, application Switzerland, May 6, 1959, 72,969; Mar. 25, 1960, 3,372/60
5 Claims. (Cl. 106—193)

This is a continuation in part of our application Serial No. 25,884, filed May 2, 1960, now U.S. Patent 3,074,945.

It is known that vat dyestuffs of great molecular weight, for example those consisting of many condensed benzene nuclei, such as indanthrone or vat dyestuffs containing at least two anthraquinone nuclei, for example the compound obtained by condensing two mols of 1-aminoanthraquinone with 1 mol terephthalic acid are valuable pigments due to their good fastness to light and migration. However, vat dyes consisting only of one tricyclic anthraquinone radical for example 1,4- or 1,5-dibenzoylaminoanthraquinone are known to be unfast to migration because of their low molecular weight.

It has now surprisingly been found that compounds of the formula

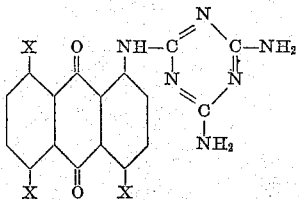

in which the symbols X represent hydrogen atoms, halogen atoms, hydroxyl-, and benzoylamino groups or the group of the formula

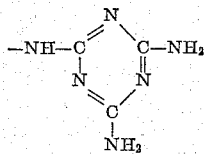

give colorings of high migration fastness when incorporated in high molecular material.

These pigments may be obtained in known manner by condensing an aminoanthraquinone of the formula

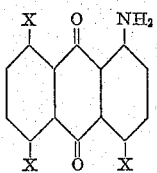

in which the symbols X represent hydrogen or halogen atoms, amino-, hydroxy-, alkoxy- or benzoylamino groups with at least one molecular proportion of cyanuric chloride for each amino group and exchanging in the so-obtained condensation product the chlorine atoms by amino groups by heating with ammonia. As appropriate aminoanthraquinones there may be used: 1-aminoanthraquinone, 1-amino-4-hydroxyanthraquinone, 1-amino-4-methoxyanthraquinone, 1-amino-4-, -5- or -8-benzoylaminoanthraquinone, 1,4-, 1,5- or 1,8-diaminoanthraquinone, 1,4,5,8 - tetraminoanthraquinone, 1,5 - diamino-4,8-dihydroxyanthraquinone.

As materials which can be dyed by the present process there may be mentioned, for example, plastic substances, such as rubber, casein, polymerization resins, such as polyvinyl chloride and its co-polymers, polyvinyl acetals, polyolefines such as polyethylene, polypropylene, polystyrene and mixed polymers of styrene with polyesters obtained from unsaturated dicarboxylic acids and diols, polyacrylates and their co-polymers, silicone and silicone resins. The pigments to be employed according to the present method are moreover suitable for producing colored condensation resins, in particular aminoplasts, for example urea formaldehyde or melamine formaldehyde resins, polyethylene terephthalate, polyaddition resins, such as epoxy or poly urethane resins or alkyd resins, and also for manufacturing colored lacquers containing one or more of said resins in any organic solvent, or aqueous emulsions containing one or more of said resins or precondensates, if required in the presence of organic solvents, for example an oil-in-water or a water-in-oil emulsion. Such emulsions are suitable especially for impregnating or printing on textiles or other sheet-like structures, such as paper, leather or fabrics consisting of glass fibers, if necessary with subsequent hardening by heat treatment. The pigments to be employed according to the present process may also be employed for producing spin-dyed fabrics, for example of viscose, cellulose esters or polyacrylonitrile. Moreover, they can be used with advantage in the manufacture of cosmetic preparations.

The pigments to be employed according to the present process, which are obtained as a rule in a physically usable form during synthesis, are advantageously brought into a finely divided state before application, for example by grinding the crude pigments in dry or watery-moist form with or without the addition of an organic solvent and/or of a salt which can be washed out.

The pigments to be employed according to the present process may be used either in pure form as so-called toners or in the form of preparations in which the pigment is present in a finely divided state, advantageously with a particle diameter of not more than 3μ. Such preparations, which may also contain the usual additions, for example dispersing agents or binders, can be prepared in manner known per se by intensive mechanical treatment, for instance on roll mills or in suitable kneading apparatus. In this connection, the dispersing medium permitting the intensive working up is selected according to the purpose in view, for example to produce aqueous dispersible preparations sulfite waste liquor or dinaphthylmethanedisulfonic acid salts will be employed, and, for the production of acetate silk spinning preparations, acetyl cellulose mixed with a little solvent.

Owing to the favorable physical form in which the products according to the present invention are generally obtained and owing to their chemical inertness and good temperature stability, they can normally be distributed readily in substances or preparations of said kind, this being done advantageously at a time when said substances or preparations do not yet have their final form. The steps required for shaping, such as spinning, moulding, hardening, casting, cementing and the like, can then also be carried out readily in the presence of the present pigments without any possible chemical reactions of the substrate, such as further polymerizations, condensations or polyadditions, being impeded.

The following examples illustrate the invention, the parts signifying, unless otherwise stated, parts by weight, the percentages being by weight, while the temperatures are given in degrees centrigrade.

*Example 1*

5 parts of the dyestuff of the formula (I)

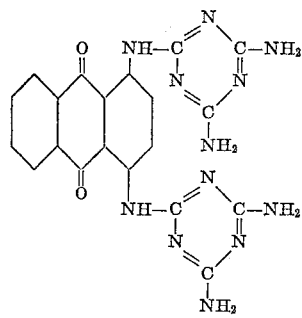

are mixed with 95 parts of dioctyl phthalate and ground in a ball mill until the dyestuff particles are smaller than 3μ.

0.8 part of this dioctyl phthalate paste is mixed with 13 parts of polyvinyl chloride, 7 parts of titanium dioxide and thereupon rolled out for 5 minutes on a two-roll mill at 140° C.

A violet coloring of good light and migration fastness is obtained.

The dyestuff of the Formula I can be obtained as follows:

95.2 parts of 1:4-diaminoanthraquinone are stirred in 1500 parts of nitrobenzene at 60° C. 296 parts of cyanuric chloride are then added and the mixture is heated for 3 hours at 110–115° C., allowed to cool and the condensation product is filtered off, then washed with nitrobenzene, benzene and chloroform and dried under reduced pressure.

194 parts of the resulting product are then stirred in an autoclave with 1500 parts of nitrobenzene. Dry ammonia gas is then introduced until a pressure of about 6 atmospheres gauge has been reached, the mixture is heated to 140–150° C. and maintained at this temperature for 15 hours, then allowed to cool and filtered. The filter residue is washed with benzene, alcohol and water and dried under reduced pressure at 90–100° C.

*Example 2*

40 parts of a nitrocellulose lacquer, 2.375 parts of titanium dioxide and 0.125 part of the dyestuff according to Example 1 are ground for 16 hours in a rod mill. The lacquer obtained is spread out in a thin layer on an aluminum foil. A coat of violet lacquer of very good fastness properties is obtained.

*Example 3*

A mixture consisting of 25 parts of the dyestuff according to Example 1, 25 parts of acetyl cellulose (54.5% combined acetic acid), 100 parts of sodium chloride and 50 parts of diacetone alcohol are treated in a kneader while being cooled until the desired degree of fineness of the pigment is attained. 25 parts of water are then added and kneading is carried out until a fine-grained mass has been produced. This is placed on a suction filter and the sodium chloride and the diacetone alcohol are washed out completely with water. The product is dried in a vacuum cupboard at 85° C. and ground in a hammer mill.

1.33 parts of the pigment preparation obtained are added to an acetate silk spinning mass consisting of 100 parts of acetyl cellulose and 376 parts of acetone. Stirring is carried out for 3 hours, this being sufficient for the complete distribution of the dyestuff. The filament obtained from this mass by the usual method after the drying process exhibits a violet coloration which has very good fastness properties.

*Example 4*

0.25 part of the dyestuff according to Example 1 is ground for 24 hours in a rod mill with 40 parts of an alkyd melamine stoving lacquer containing 50% of a phthalic acid glycerine polyester fatty acid resin and a melamine formaldehyde resin and 4.75 parts of titanium dioxide. The lacquer obtained is painted in a thin layer on an aluminum foil and baked for one hour at 120° C. A coat of violet lacquer having good light fastness is obtained.

*Example 5*

4.8 parts of the dyestuff according to Example 1 are ground with 4.8 parts of the sodium salt of 1:1'-dinaphthylmethane-2:2'-disulfonic acid and 22.1 parts of water in one of the known colloid mills until all the dyestuff particles are smaller than 1μ. The pigment suspension obtained in this way has a pigment content of about 15%.

If this aqueous suspension is added to viscose spinning solution, a violet-colored cellulose filament of very good fastness properties is obtained by the conventional spinning process.

*Example 6*

A dyebath is prepared containing, to 1.000 parts of water, 15 parts of a mixed-polymer latex consisting of 85.8 parts of isobutyl acrylate, 9.6 parts of acrylonitrile and 4.6 parts of acrylic acid, 15 parts of a 70% emulsion of a methylol melamine allyl ether emulsified with Turkey red oil and modified with soybean fatty acid, 50 parts of a water-soluble methyl ether of a urea formaldehyde condensation product containing, condensed in, more than 2 mols of formaldehyde per mol of urea, 5 parts of the pigment suspension obtained according to Example 5, paragraph 1, and 20 parts of formic acid of 10% strength.

Cotton fabric is introduced dry at room temperature into the above dyebath, squeezed out on a pad with a liquid absorption of 65–80%, dried normally, if necessary under tension (clamps or needle frame) and finally hardened at 145–150° C. for 5 minutes.

A violet coloring is obtained having good fastness properties.

*Example 7*

100 parts of the pigment dyestuff employed in Example 1 are mixed with 40 parts of the addition product of 15 mols of ethylene oxide and 1 mol of di-tert. butyl-paracresol and 20 parts of water in a kneading apparatus to form a viscous, homogeneous paste and thoroughly kneaded until the dyestuff agglomerates produced during drying have been dispersed uniformly finely. The mass is carefully diluted with 90 parts of water under constant further kneading and finally homogenized by means of a funnel mill or another suitable apparatus until a pliable homogeneous paste is produced which contains practically exclusively dispersed primary dyestuff particles having a diameter of 3μ at the most. 250 parts of a violet paste containing 40% of pigment are collected.

60 parts of this paste are mixed with 850 parts of an oil-in-water emulsion containing 55% of petroleum hydrocarbons, 5% of a styrene-butadiene emulsion mixed polymer and 3.5% of a solution consisting of about 75% by weight of water-insoluble melamine formaldehyde primary condensate modified with n-butanol and about 25% by weight of n-butanol as separate inner phase and 36.5% of an aqueous solution containing 7.5 parts by weight of an ion-free emulsifier prepared according to Patent No. 2,946,767, granted July 26, 1960, to Hans U. Gassmann, Example 3, to 92.5 parts by weight of water as outer phase, 80 parts of water and 10 parts of ammonium nitrate, that is 1.000 parts in all, to form a homongeneous, pliable paste.

This paste may be printed on to fabrics made of natural or regenerated cellulose or of synthetic fibers of the most diverse types by means of rollers or screens in the usual manner. After drying at normal or elevated temperature and subsequent heat treatment for some minutes at 120–150° C. violet printing effects having excellent rubbing, washing and light fastness are obtained.

Example 8

A mixture consisting of 50 parts of the pigment dyestuff according to Example 1, 100 parts of Staybelite Ester 10 (glycerine ester of hydrated colophonium), 200 parts of sodium chloride and 18 parts of diacetone alcohol are treated in a kneader under cooling until the desired degree of fineness of the pigment is obtained. The sodium chloride and the diacetone alcohol are then removed from the kneading mass by introducing water having a temperature of 80° C. The kneading mass itself is preserved. The salt-free and solvent-free kneading product is completely dried by heating the kneader with steam and pulverized in the kneader after cooling.

The preparation may be used, for example, for coloring lacquers. To this end, the preparation is advantageously mixed into a paste with a little toluene and the paste obtained is mixed together with the lacquer.

Example 9

150 parts of the dry violet pigment according to Example 1 are ground together with 300 parts of a casein solution of 20% strength, 40 parts of a dispersing agent and 250 parts of distilled water in a suitable apparatus until the major part of the pigment particles has a size of less than $1\mu$. The pigment paste obtained is mixed up with 50 parts of a wax emulsion of 30% strength and another 200 parts of a casein solution of 20% strength and in this way a homogeneous pigment paste of 15% strength is obtained. 50 parts of this pigment preparation of 15% strength are well mixed with 100 parts of a casein solution of 20% strength, 5 parts of sodium sulforicinoleate, 50 parts of a 10% egg albumin solution and 870 parts of distilled water.

This pigment dispersion, which is ready for use, is applied once or twice to pre-dyed chrome grain leather by means of a plush board or hairbrush. Then follows the levelling application with the same pigment solution by spraying on at a pressure of 4 to 5 atmospheres. Thereupon, a casein solution of 20% strength is applied in the same manner, briefly dried and hardened with a formaldehyde solution of 8–10% strength. By mechanical glazing and hydraulic pressing of the leather surface at 60–80° C. and a pressure of 150–200 atmospheres, the pigment application is sealed off. The dye has good light fastness and excellent fastness to wet rubbing and high transparency.

Both during the glazing and during the hot pressing, no color change can be observed.

Doubling of the quantity of pigment used in the finishing solution effects a deepening of the color without shifting the color shade.

The above described violet pigment paste can be mixed with suitable similarly composed pigment preparations. In this way, for example, in combination with white pigments violet even pastel tones having excellent light and migration fastness are obtained.

Example 10

For the so-called ironing preparation, binders based on polyacrylic acid ester inter alia may be employed without any trouble in addition to the violet pigment paste; in this way softer and more flexible covering layers are obtained than with the sole use of casein binders.

In order to produce an ironing preparation, the pigment solution may be composed as follows:

50 parts of a violet pigment paste of 15% strength, 100 parts of casein solution of 20% strength, 25 parts of sodium sulforicinoleate, 150 parts of a 40% emulsion of a polyacrylic acid ester and 675 parts of distilled water. This thinly liquid pigment suspension is first applied to the generally buffed leather to be dyed by means of a plush board. After drying and hydraulic pressing at 60° C. and a pressure of 100–150 atmospheres, the levelling application is made with the same pigment solution by spraying on at a pressure of 4–5 atmospheres.

Finally, a glazing coat is applied to the dyed leather which consists of 150 parts of a casein solution of 20% strength which is thereafter fixed by spraying over with a formaldehyde solution of 8–10% strength. After thorough drying, the leather surface is once more pressed hydraulically (75–80° C., 200 atmospheres' pressure).

The dye is excellently fast to wet rubbing and migration fast. In addition to the good light fastness, the high transparency, vividness and natural appearance are especially worth mentioning.

Example 11

1 part of the dyestuff of Example 1 is mixed with 99 parts of polyethylene and rolled out for 10 minutes between the two rolls calender at a temperature of 140–170° C. There is obtained a violet-colored sheet having excellent fastness to light and migration. The sheet may be granulated and the granules used for injection moulding or for making foils.

Example 12

99 parts of isolactic polypropylene in the form of chippings are "breadcrumbed" in the dry state with 1 part of the dyestuff used in Example 1. The breadcrumbed chippings are heated to 180–220 C. in an extruder. The extruded polypropylene has a violet coloration and may be granulated and the granulate used for injection moulding.

Example 13

When the pigments indicated in column I of the following table are used in the Examples 1 to 12 products are obtained whose color is indicated in column II.

| No. | Pigments | Coloration |
|---|---|---|
| 1 | (structure) | Yellow. |
| 2 | (structure) | Red. |

| No. | Pigments | Coloration |
|---|---|---|
| 3 | 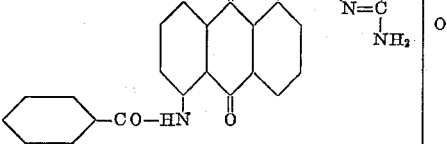 | Orange. |
| 4 | 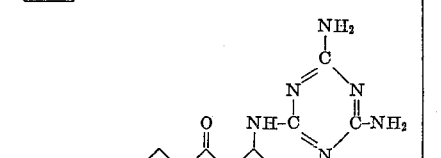 | Scarlet. |
| 5 | 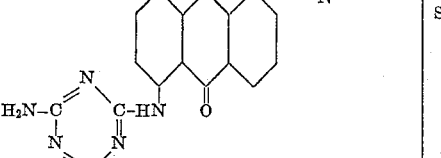 | Blue. |
| 6 | 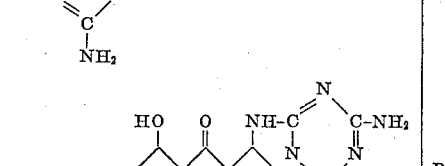 | Blue. |
| 7 | 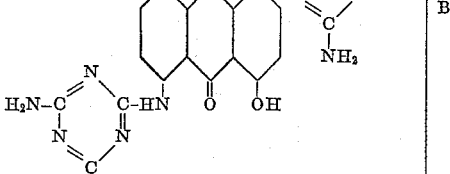 | Reddish yellow. |

These pigments may be obtained in analogy to the dyestuff of Example 1 by condensing the corresponding aminoanthraquinone with cyanuric chloride, and heating the so-obtained chlorine-containing condensation product with ammonia.

What is claimed is:

1. A high molecular organic material selected from the group consisting of cellulose, cellulose esters, casein, polymerization resins, condensation resins, and polyaddition resins having incorporated as pigment in a finely divided form a dyestuff of the formula

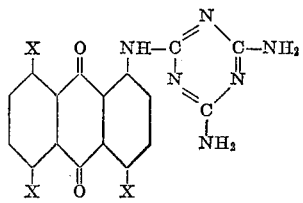

in which the symbols X represent members selected from the group consisting of hydrogen atoms, halogen atoms, hydroxyl- and benzoylamino groups and the group of the formula

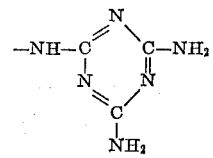

2. Polyvinyl chloride having incorporated as pigment in a finely divided form the dyestuff of the formula

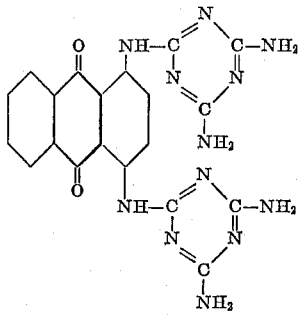

3. Cellulose having incorporated as pigment in a finely divided form the dyestuff of the formula

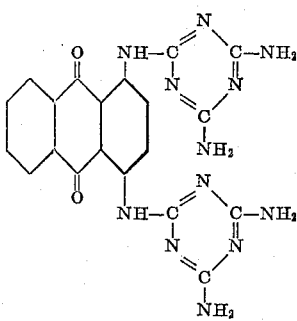

4. A melamine-formaldehyde resin having incorporated as pigment in a finely divided form the dyestuff of the formula

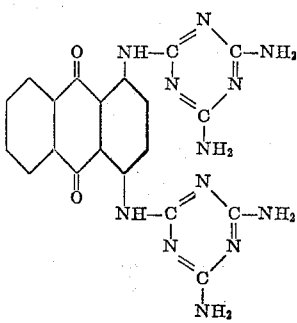

5. Polyethylene having incorporated as pigment in a finely divided form the dyestuff of the formula
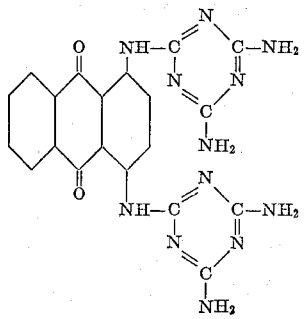
References Cited by the Examiner
UNITED STATES PATENTS
| | | | |
|---|---|---|---|
| 1,437,783 | 12/22 | Steinbuch | 260—249 |
| 2,852,535 | 9/58 | Peter et al. | 8—555 |
| 2,927,035 | 3/60 | Wegman et al. | 106—165 |
| 3,022,304 | 2/62 | Staeuble et al. | 8—57 |
| 3,070,602 | 12/62 | Buehler | 106—165 |
ALEXANDER H. BRODMERKEL, *Primary Examiner.*
MORRIS LIEBMAN, *Examiner.*